(12) United States Patent  
Shahmuradyan

(10) Patent No.: US 7,514,645 B2
(45) Date of Patent: Apr. 7, 2009

(54) MASTER LIGHT SWITCH FOR GROUND VEHICLES

(75) Inventor: Tigran Shahmuradyan, Aurora, IL (US)

(73) Assignee: ELC Industries Corp., Aurora, IL (US)

( * ) Notice: Subject to any disclaimer, the term of this patent is extended or adjusted under 35 U.S.C. 154(b) by 0 days.

(21) Appl. No.: 11/434,974

(22) Filed: May 16, 2006

(65) Prior Publication Data

US 2006/0266634 A1    Nov. 30, 2006

Related U.S. Application Data

(60) Provisional application No. 60/685,782, filed on May 31, 2005.

(51) Int. Cl.
*H01H 9/00* (2006.01)
(52) U.S. Cl. ............. 200/564; 200/11 R; 200/61.45 M; 200/316
(58) Field of Classification Search ............. 200/11 R, 200/11 C, 17 R, 61.45 M, 316, 527, 531, 200/544, 562–570
See application file for complete search history.

(56) References Cited

U.S. PATENT DOCUMENTS

| 1,553,330 | A | * | 9/1925 | Schmid ........................ 200/14 |
| 2,266,548 | A | | 12/1941 | Haines |
| 3,167,620 | A | * | 1/1965 | Keyser et al. ............. 200/11 R |
| 3,225,250 | A | | 12/1965 | Hershberger |
| 4,827,241 | A | | 5/1989 | Riser et al. |
| 4,885,434 | A | | 12/1989 | Vultaggio et al. |
| 5,264,821 | A | | 11/1993 | Vultaggio et al. |
| 5,359,165 | A | * | 10/1994 | Leveque et al. ............. 200/317 |
| 5,602,427 | A | | 2/1997 | Dimitriev |
| 5,718,326 | A | * | 2/1998 | Larose et al. ............... 200/314 |
| 5,743,384 | A | * | 4/1998 | Clark ......................... 200/344 |
| 6,965,085 | B1 | * | 11/2005 | Orrico et al. ................. 200/314 |

* cited by examiner

*Primary Examiner*—Elvin G Enad
*Assistant Examiner*—Marina Fishman

(57) ABSTRACT

A master light switch for a ground vehicle includes an actuator rotatably mounted to a housing. A switching contact is axially movably mounted to the actuator to rotate with the actuator. A plurality of circuit contacts faces the switching contact wherein different circuit contacts are electrically connectable by the switching contact depending on the rotary position of the actuator. A spring element urges the switching contact axially towards the circuit contacts to make contact between the switching contact and a circuit contact. A lift-and-set formation is arranged between the housing and the switching contact to axially displace the switching contact from a circuit contact during rotary movement of the actuator and to release the switching contact at a defined rotary position of the actuator to be axially urged by the spring element to axially move to make electrical contact between the switching contact and a circuit contact. A locking mechanism prevents turning of the actuator unless the locking mechanism is released. The locking mechanism is releasable and the actuator is turnable by one hand of a vehicle driver.

14 Claims, 11 Drawing Sheets

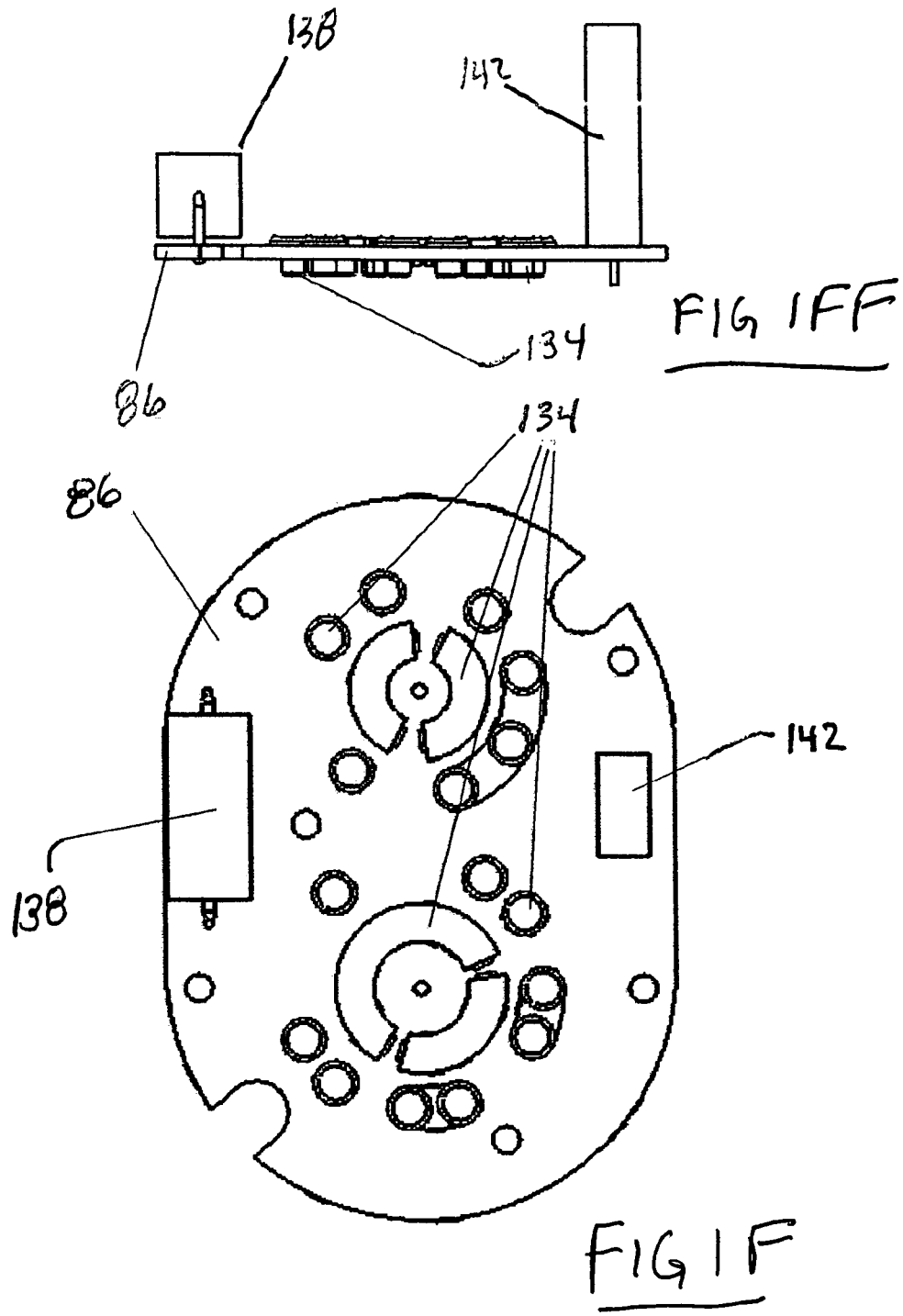

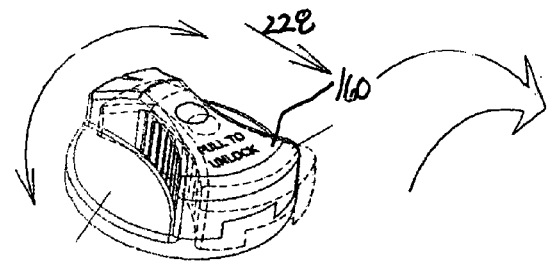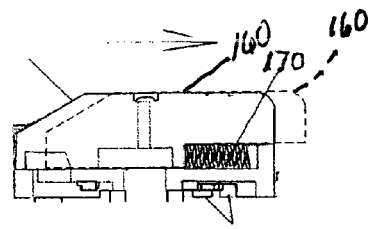
Fig 3B
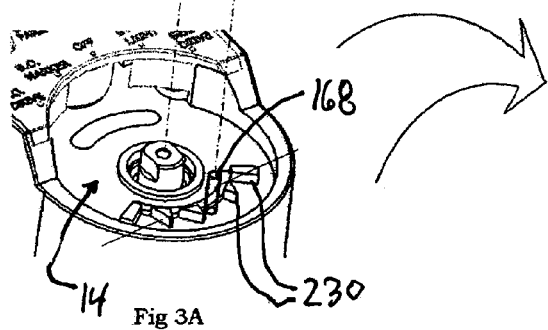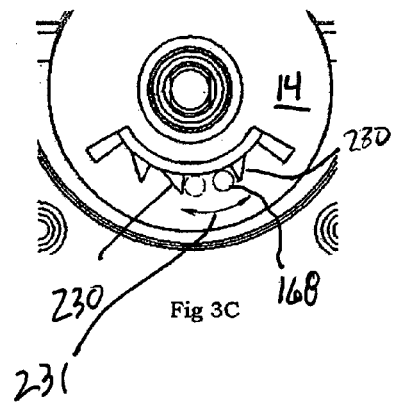
Fig 3A
Fig 3C
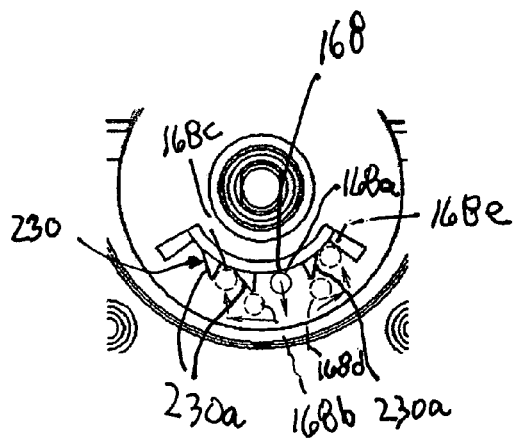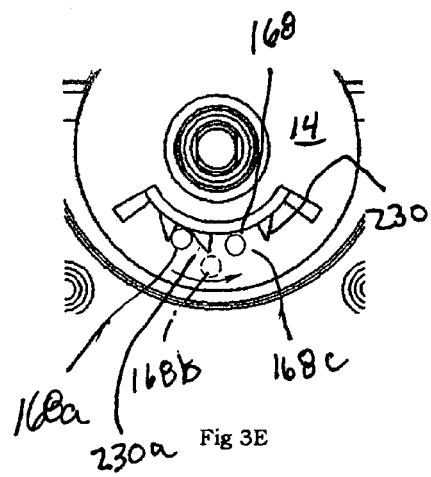
Fig 3D
Fig 3E

MASTER LIGHT SWITCH FOR GROUND VEHICLES

This application claims the benefit of U.S. Provisional Application Ser. No. 60/685,782 filed May 31, 2005.

BACKGROUND OF THE INVENTION

The military version of the common vehicle headlight switch, referred to as the "Main Lighting Switch" or MLS (p/n: MS-51113) consists of three levers: one for selecting panel lights, one for the selecting service drive lights and blackout lights, and one for a lockout function. The lockout prevents accidental turn on of the service drive lights. Designed in the 1950s, the switch can't be seen at night without a flashlight, so there is always the possibility of accidentally turning on the headlights during nighttime military operations. Additionally, the elongated levers are vulnerable to breakage.

The present inventor recognizes that it would be desirable to provide a master light switch that is cost effectively manufactured, had ergonomically convenient controls, is electrically reliable against shorts and power surges and reliable under a wide range of operating conditions and temperatures for military operations, and is effectively operable under military conditions.

SUMMARY OF THE INVENTION

The invention provides a master light switch for a ground vehicle that includes a housing, an actuator such as a knob or lever, a switching contact, a plurality of circuit contacts, a spring element and a lift-and-set formation. The actuator is rotatably mounted to the housing. The switching contact is axially movably mounted to the actuator to rotate with the actuator. The plurality of circuit contacts faces the switching contact wherein different circuit contacts are electrically connectable by the switching contact depending on the rotary position of the actuator. The spring element urges the switching contact axially towards the circuit contacts to make contact between the switching contact and a circuit contact. The lift-and-set formation is arranged between the housing and the switching contact to axially displace the switching contact from a circuit contact during rotary movement of the actuator and to release the switching contact at a defined rotary position of the actuator to be axially urged by the spring element to axially move to make electrical contact between the switching contact and a circuit contact.

Preferably, the lift-and-set formation comprises at least one roller rotatably mounted on the housing, and a cam hub mounted with the switching contact to be axially movable therewith and to rotate with the actuator. The cam hub has at least one cam surface engageable with the roller to define an advanced position wherein the switching contact makes contact with a circuit contact, and a retracted position wherein the switching contact is displaced from the circuit contact, as the cam surface passes over the roller. The spring element acts between the housing and the cam hub.

Preferably, the at least one roller comprises a plurality of rollers and the cam hub comprises a plurality of cavities defining a plurality of cam surfaces. In this way, a plurality of switch positions can be defined by the rollers and cam surfaces.

Preferably, the master light switch comprises a further switching contact. The lift-and-set formation is arranged between the housing and the further switching contact to axially displace the further switching contact from the circuit contact during rotary movement of the actuator and to release the further switching contact at a defined rotary position of the actuator to be axially urged by the spring to axially move to make electrical contact between the further switching contact and a circuit contact. A rotor is mounted to the cam hub, the rotor carrying the switching contact and the further switching contact at rotary offset positions, to define two different switching configurations selectable using the actuator.

Preferably, the switching contact and/or the further switching contact is movably mounted to the rotor in a direction toward and away from a circuit contact, and comprising a further spring element located between the rotor and the switching contact. The further spring element provides for a resilient contact pressing between the switching contact and a selected one or more circuit contacts.

Preferably, the actuator comprises a lens therethrough, and the master light switch comprises a lighting element arranged between the switching contact and the actuator. The lighting element is arranged to beam light through the lens to illuminate a portion of the actuator.

According to another aspect of the invention, a master light switch for a ground vehicle is provided that includes a housing, an actuator rotatably mounted to the housing, a switching contact, a plurality of circuit contacts, and a locking mechanism. The actuator is rotatably mounted to the housing. The switching contact is axially movably mounted to the actuator to rotate with the actuator. The plurality of circuit contacts faces the switching contact, wherein different circuit contacts are electrically connectable by the switching contact depending on the rotary position of the actuator. The locking mechanism prevents turning of the actuator unless the locking mechanism is released. The locking mechanism is releasable and the actuator is turnable by one hand of a vehicle driver.

Preferably, the actuator includes a grippable outer part and a base part, the grippable outer part being mounted for sliding movement on the base part from a first position to a second position. The locking mechanism comprises a locking element mounted to the grippable outer part that engages the housing when the grippable outer part is in the first position to prevent turning of the actuator. The locking element is releasable when the grippable outer part is slid to the second position.

Preferably, the locking element comprises a pin and the housing comprises at least two teeth that releasably capture the pin between the two teeth.

Preferably, at least one of the teeth comprises an oblique surface facing the pin to allow forced rotation of the actuator in a first direction wherein the pin slides along the oblique surface, and wherein at least one of the teeth comprises a perpendicular surface which blocks movement of the pin and does not allow forced rotation of the actuator is a second direction.

The present Invention is designed to overcome the deficiencies of the prior art discussed above. The preferred embodiment of the present invention provides a switch that may provide some or all of the following advantages:

1. The switch integrates the locking mechanism with the main knob, lever, button etc., that will allow to the driver to operate the switch with one hand;
2. The switch incorporates a roller, ball, or other type of antifriction bearing-based switch kinematics that will allow substantially reducing wear of the contacts and increase the lifetime of the switch;
3. The switch provides internal, self-sufficient illumination of the front panel as well as the controls, including but not limited to: buttons, knobs, levers of the switch to enable use in the dark; and 4. The switch can be manufactured at a comparatively low cost.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 1AA is a rear perspective view of the master light switch of FIG. 1A;

FIG. 1AB is a plan view of the master light switch shown in FIG. 1A;

FIG. 1CC is an elevational view of a main switch assembly removed from the remaining portions of the master light switch for clarity of description;

FIG. 1DD is a sectional view taken generally along line 1DD-1DD of FIG. 1D;

FIG. 1EE is a sectional view taken generally along line 1EE-1EE of FIG. 1E;

FIG. 1F is a plan view of a contact board taken from FIG. 1B with some components as an example;

FIG. 1FF is an elevational view of the contact board of FIG. 1F;

FIG. 3A is an exploded, fragmentary perspective view illustrating a lock mechanism and its work principle;

FIG. 3B is a fragmentary sectional view of the lock mechanism of FIG. 3A illustrating its work principle;

FIG. 3C is a fragmentary, plan view of the lock mechanism of FIG. 3A illustrating its work principle;

FIG. 3D is a fragmentary, plan view of the lock mechanism of FIG. 3A illustrating its work principle;

FIG. 3E is a fragmentary, plan view of the lock mechanism of FIG. 3A illustrating its work principle;

DETAILED DESCRIPTION OF THE PREFERRED EMBODIMENT

Figure 1A:
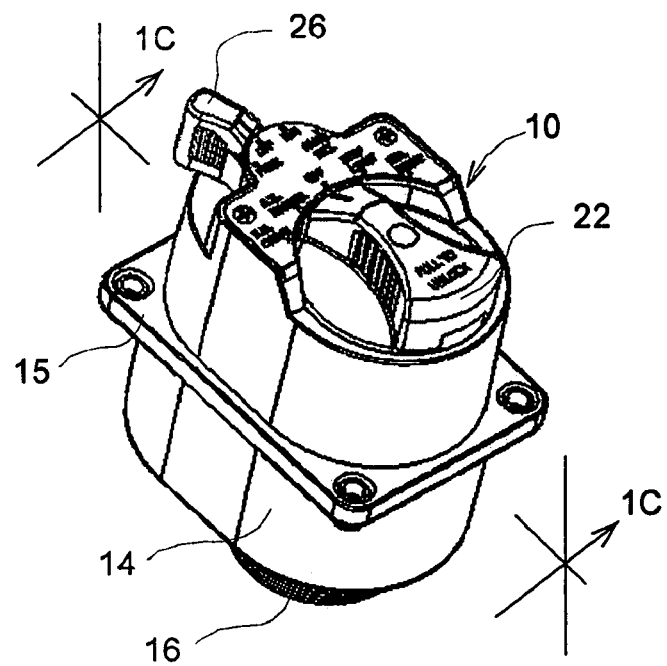
FIG. 1A is a front perspective view of a master light switch of the present invention.
Figure 1A:
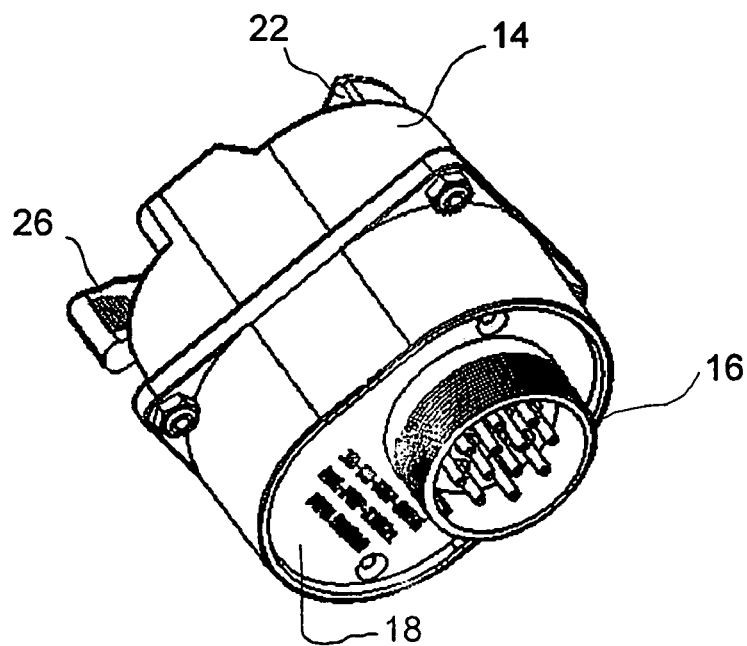
Figure 1A:
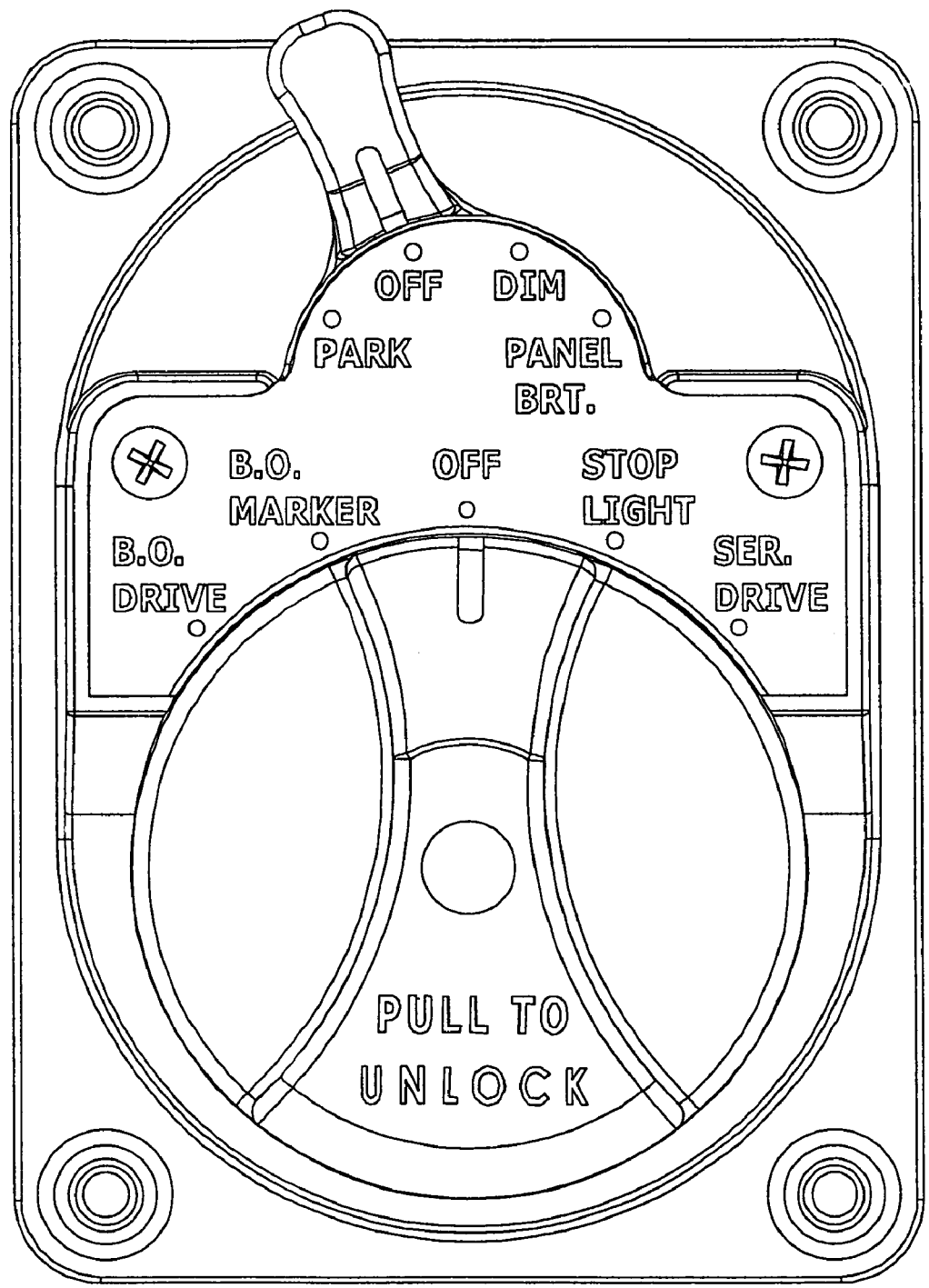
Figure 1B:
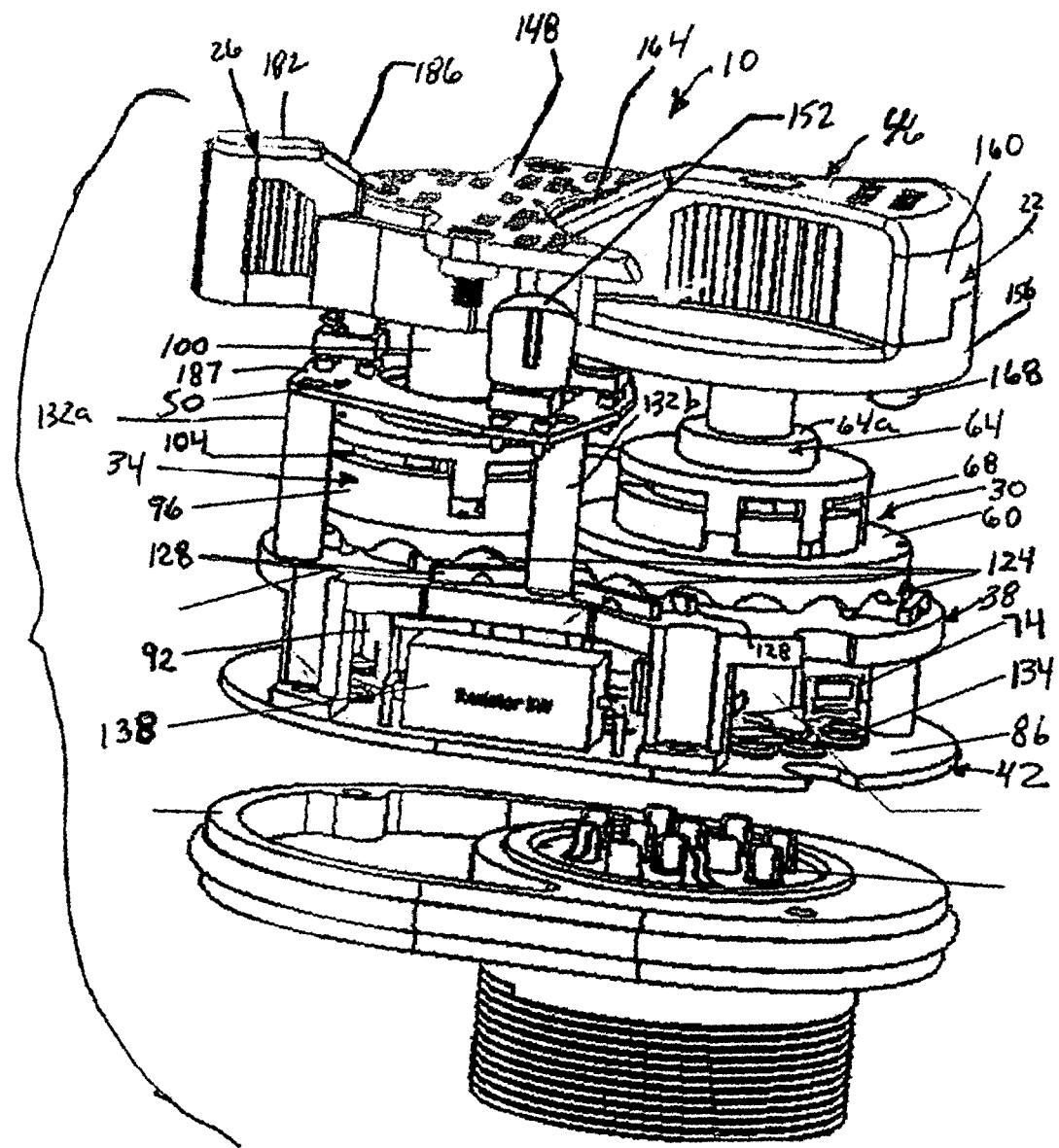
FIG. 1B is an enlarged perspective exploded view of the master light switch of FIG. 1A with the housing 14 removed to view inside parts.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Referring now to the drawings in detail wherein like reference numerals have been used throughout the various figures to designate like elements, there is shown in FIG. 1A-1FF a master lighting switch ("MLS") 10 constructed in accordance with the principles of the present invention.

FIGS. 1A and 1AA illustrate the switch 10 includes a housing 14 having an intermediate flange 15 for mounting the switch 10 to a vehicle dashboard or panel. A pin connector 16 for electrical connection of the switch 10 to the vehicle electrical system extends through a back cover 18 of the housing 14. The switch 10 includes a main knob assembly 22 and an auxiliary lever assembly 26.

FIG. 1AB illustrate the front face of the master light switch 10. The selectable functions: "B.O. DRIVE", "B.O. MARKER", "OFF", "STOP LIGHT" and "SER. DRIVE", associated with the main knob assembly and the functions: "PARK", "OFF", "DIM", and "PANEL BRT." associated with the auxiliary lever assembly, are known selectable lighting functions for military vehicles, such as for a HUMVEE military vehicle.

FIGS. 1B-1FF illustrate internal parts of the master light switch 10. The master light switch 10 comprises the following main parts or subassemblies:

A. a main switch assembly 30;
B. an auxiliary switch assembly 34;
C. the housing 14 including a frame assembly 38 and the back cover 18;
D. a contact board assembly 42;
E. a control panel assembly 46;
F. an illumination board 50;

A. The main switch assembly 30 is built on the frame assembly 38 and comprises the following: a main rotor assembly 58, a main cam hub 60, a main shaft 64, and a main coil spring 68.

Figure 1C:
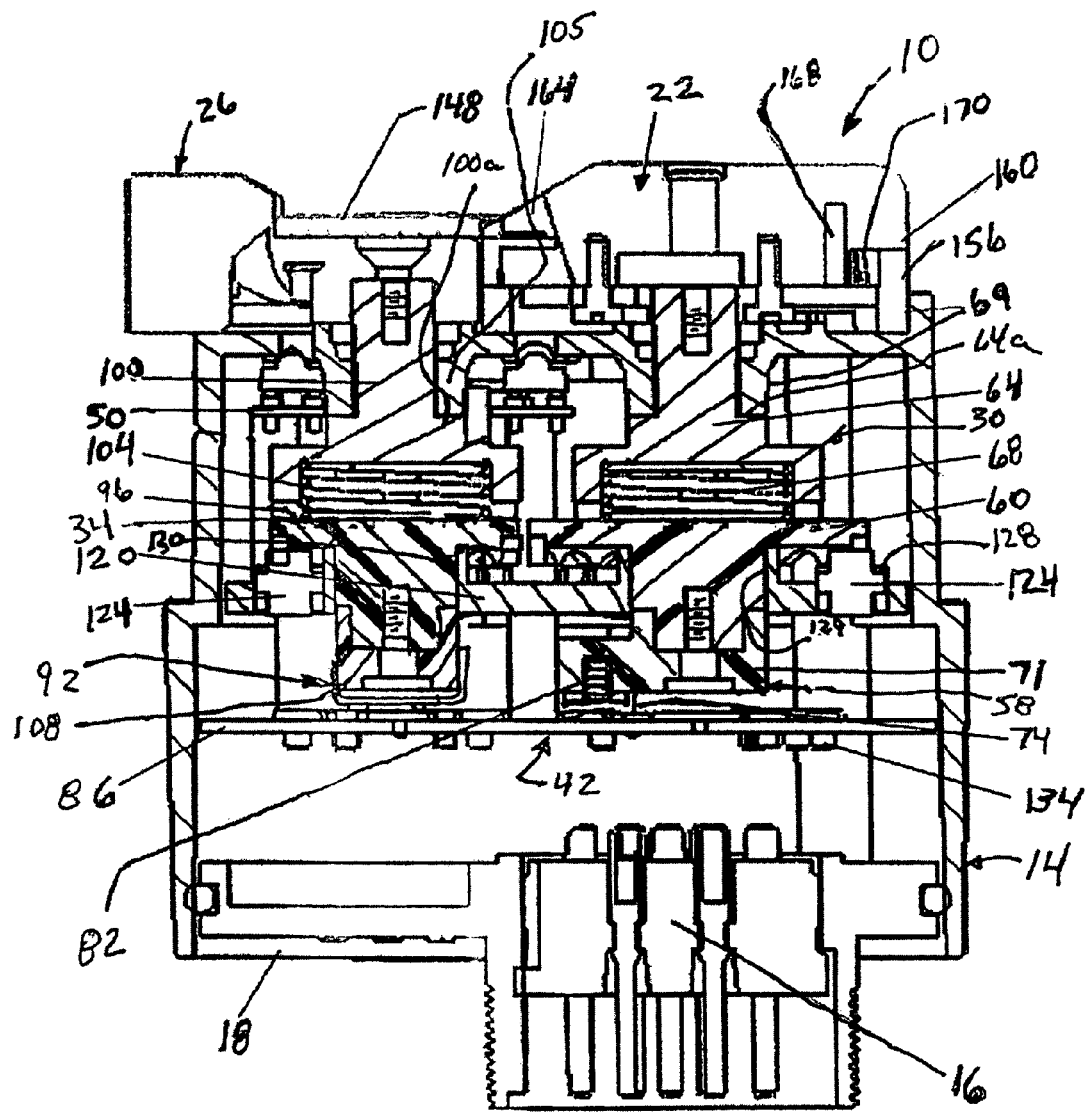
FIG. 1C is a cross section taken generally along line 1C-1C of FIG. 1A.
Figure 1C:
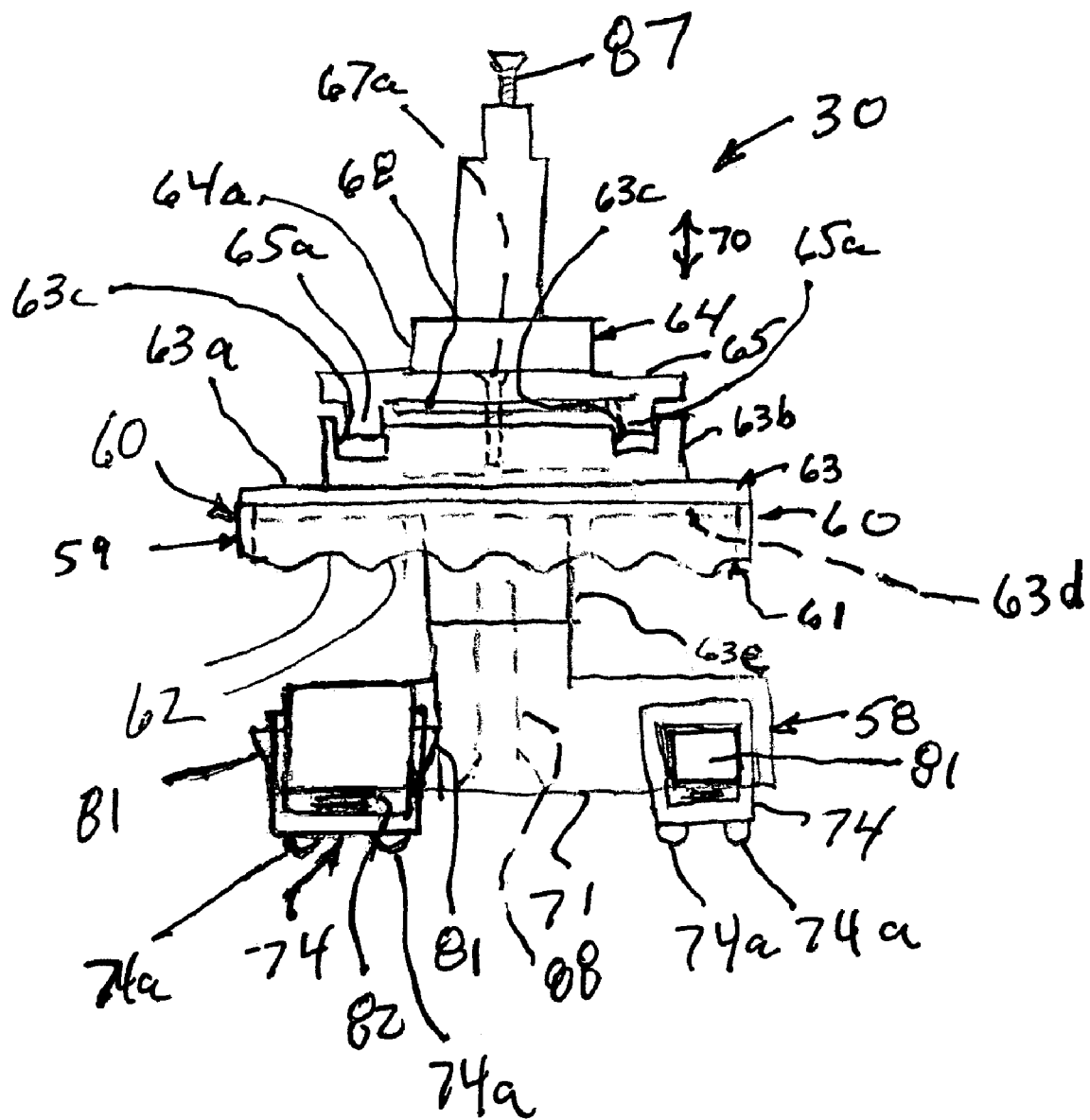

The main shaft 64 includes a flange 64a that is held down by an annular portion 69 of the housing 14 (FIG. 1C).

The main switch assembly 30, removed from the frame assembly 38 is shown in FIG. 1CC. The main cam hub 60 includes a ring 59, such as a metal ring, having a plurality of arcuate cavities 61 wherein each cavity 61 defines a cam surface 62. A housing 63, such as a plastic housing, in the form of a disk 63a with an upstanding peripheral wall 63b, includes an annular shoulder or recess 63d. The ring 59 fits around the shoulder 63d and is adhesively secured to the shoulder 63d. A central downward directed boss 63e, such as a plastic boss, is adhesively secured to, or formed with, an underside of the disk 63a. The shaft 64 includes a disk portion 65 having some spaced lugs 65a partially inserted into slots 63c in the wall 63b of the plastic housing 63. The lugs 65a transmit turning torque between the shaft 64 the housing 63. The coil spring 68 is captured between the disk portion 65 and the disk 63a and urges the main cam hub 60 toward the board 86 (FIG. 1C). A pair of screws 67a, 67b, spaced 180° around the disk portion 65 (FIG. 2D), are used to movably retain the disk portion 65 to the wall 63b. The screws 67a, 67b have an excess length to allow a relative axial displacement, along the direction 70, between the plastic housing 63 and the disk portion 65.

The main rotor assembly 58 comprises a main rotor 71 and main rotor upper sliding contacts 74, FIGS. 1CC, 1E and 1EE. Upper contacts 74 are situated below the main rotor 71. The rotor 71 can be composed of a plastic material for electrical insulation purposes. The rotor 71 includes tapered lugs 81 that are used to fix the contacts 74 to the rotor 71. The contacts have a U-shape wherein the legs of the U-shape have rectangular openings to receive the lugs 81 in a snap fit fashion. The base of the U-shape includes one or more spherical nubs 74a facing the board 86. Coil springs 82, located partially within the rotor 71 and located between the rotor 71 and the base of the U-shape contacts 74, are utilized to push down the contacts 74 to firmly contact the nubs 74*a* to a contacts board 86.

The shaft 64 threadingly receives a top screw 87 to secure the knob base 156 (FIG. 1C), and the boss 63*e* threadingly receives a bottom screw 88 to secure the rotor 71.

B. The auxiliary switch assembly 34 is built on the frame assembly 38 and comprises the following: an auxiliary rotor assembly 92, an auxiliary cam hub 96, an auxiliary shaft 100, and an auxiliary spring 104.

The auxiliary shaft 100 includes a flange 100*a* that is held down by an annular portion 105 of the housing 14 (FIG. 1C).

Figure 1D:
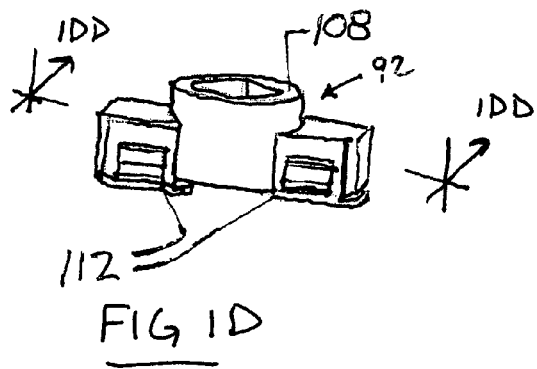
FIG. 1D is a perspective view of an auxiliary rotor assembly taken from FIG. 1B.
Figure 1D:
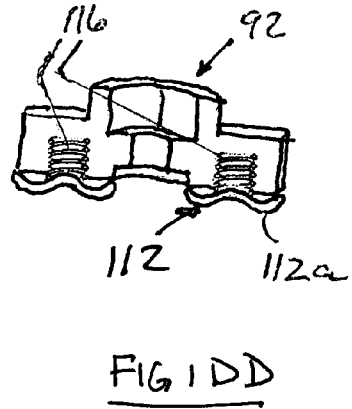
Figure 1E:
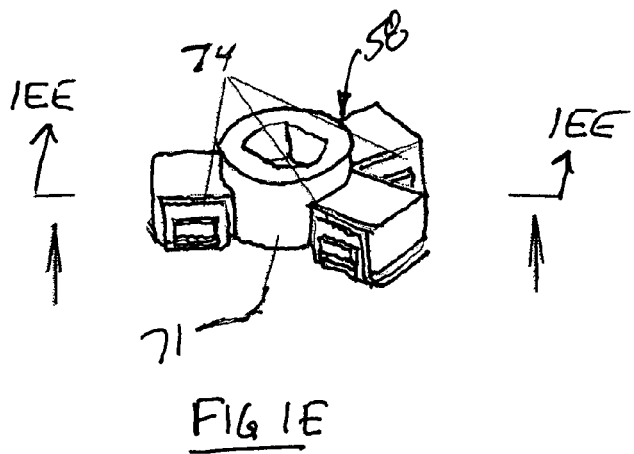
FIG. 1E is a perspective view of a main rotor assembly taken from FIG. 1B.
Figure 1E:
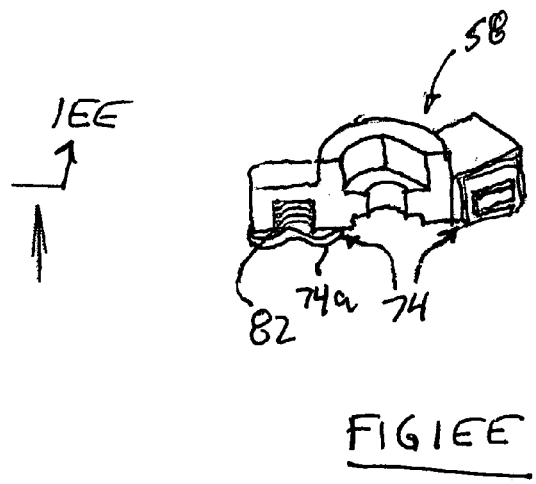

The auxiliary rotor assembly 92 comprises an auxiliary rotor 108 and auxiliary rotor upper sliding contacts 112, FIGS. 1D and 1DD. Coil springs 116 between the rotor 108 and the contacts 112 are utilized to push down the contacts 112 to the contacts board 86.

The auxiliary switch assembly 34 is constructed substantially identically to the main switch assembly 30 described above and shown in FIG. 1CC, except that the auxiliary rotor is shown having two contact 112 while the main rotor is shown as having three contacts 74.

Non-sliding contacts with or without the coil springs can be used for both main and auxiliary rotors.

C. The housing 14 contains all the parts and subassemblies of the MLS 10. Top external part of the housing 14 also is a part of the locking mechanism. The locking is effected with help of locking teeth that are located under the main knob.

The back cover 18 closes the MLS 10. The pin electrical connector 16 is located on the back cover and is intended to provide connection between the vehicle wiring harness and the MLS 10.

The frame assembly 38 comprises the following parts: a frame 120, rollers 124, brackets 128 fixed to the frame 120 that rotationally hold the rollers 124, and spacer posts 132*a* (FIG. 1B), 132*b* (FIG. 1B) and 132*c* (FIG. 4B) for supporting the illumination board 50 from the frame 120. The frame 120 includes journal portions 129, 130 for guiding sliding movement of the respective bosses 63*e* of the switch assemblies 30, 34. Preferably, three rollers 124 and corresponding brackets 128 are provided for each switch assembly 30, 34, spaced at approximately 120° around an axis of the respective switch assembly.

D. The contact board assembly 42 comprises the board 86, a plurality of contacts 134, and electrical components including but not limited to a resistor 138 and a circuit breaker 142, as shown in FIGS. 1F and 1FF. The contacts 134 and the components are installed on-board and connected in the electrical circuit and to the connector 16 by any applicable method.

As a variation, the electrical contacts can be substituted by the following switches included but not limited: magnetic, semiconductor, or solid state.

E. The control panel assembly is built on the top of the MLS housing 14 and comprises the following main parts and subassemblies:
  a. the main knob assembly 22;
  b. the auxiliary lever assembly 26;
  c. a mode lens 148; and
  d. side lenses 152, 153.

a. The main knob assembly 22 comprises the following: a main lever or knob 155 having a main knob base 156 and a main knob cover 160, a main knob lens 164, a locking pin 168, and two coil springs 170. The locking pin 168 is located under the main knob base 156 and can be firmly jointed to, or to be part of, the main knob base 156.

b. The auxiliary lever assembly 26 comprises the following: an auxiliary lever or knob 182 and an auxiliary lens 186.

c. The mode lens 148 has the mode markings shown in FIG. 1AB on the top to help the operator control the MLS 10.

d. The side lenses 152, 153 are arranged to transfer light beams from the light sources to the mode lens 148. Light emitting diodes are used in the preferred embodiment of the invention but they can be substituted by any other type of the lights source, included but not limited: incandescent, halogen, and xenon.

F. The illumination board 50 includes a circuit board 187 that mounts and provides electrical circuits and components for operation of the LED-s. The board 187 is spaced from the frame 120 by the spacer posts 132*a*, 132*b*, 132*c*. The spacer posts are screwed to the frame 120 and to the board 187.

Turning to FIGS. 2A-2F, the main and auxiliary switches work principle is depicted using the auxiliary switch 34 as an example. The main switch work principle is identical to the auxiliary switch work principle.

Cam hub 96 is firmly jointed with rotor 108 and cam hub 60 with rotor 71 through the journal portions 129, 130 in the frame 120. The frame 120 is located between the rotors and the cam hubs. These two jointed couples are able to move up and down within some restricted distance as well as rotate around their axis.

When an operator rotates either the main knob assembly 22 or the auxiliary lever assembly 26 in their turn they rotate the respective cam assemblies 58, 92 by the shafts 64, 100.

Figure 2A:
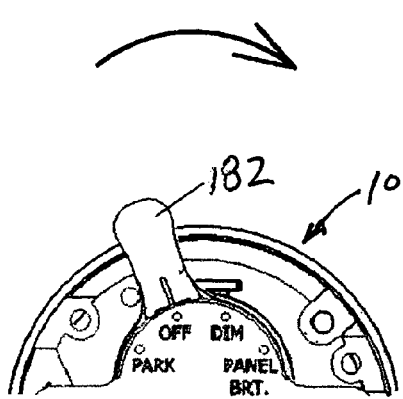
FIGS. 2A-2F are fragmentary plan and elevational views illustrating a main switch assembly and its work principle.
Figure 2B:
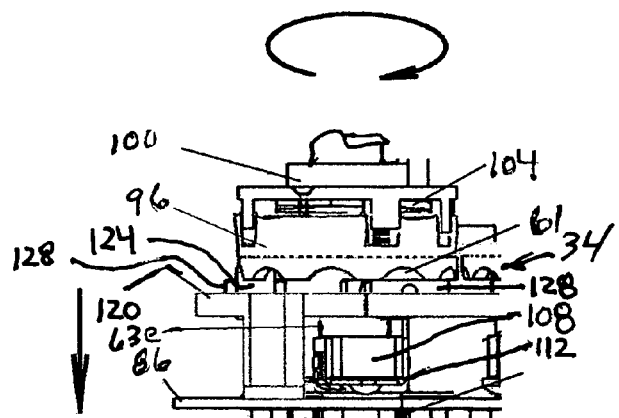
Figure 2C:
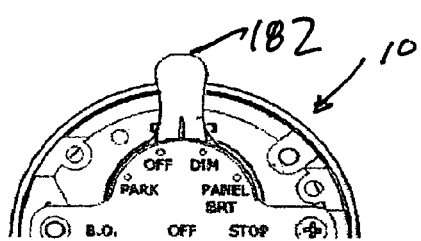
Figure 2D:
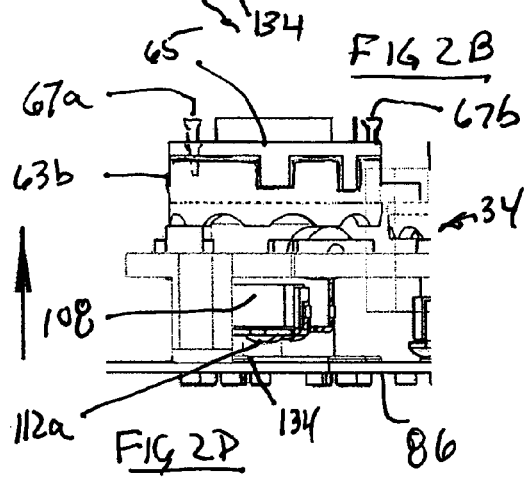
Figure 2E:
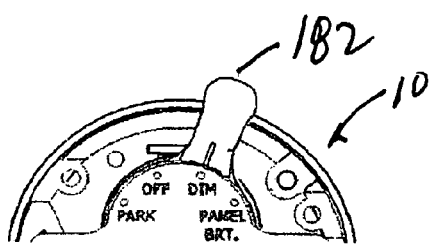
Figure 2F:
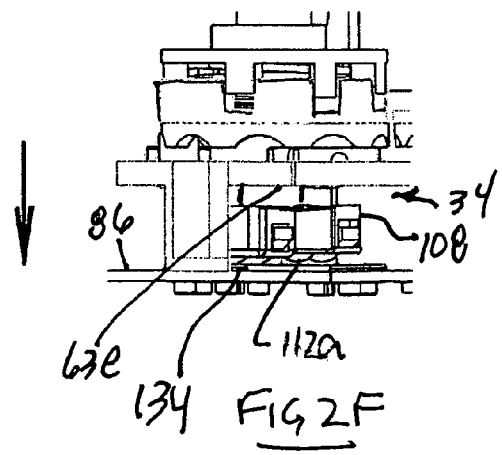

The cam hubs 96, 60 rotate onto and over the rollers 124, and the respective spring 68,104 are compressed. When three cam hub cavities 61 are situated exactly on top of the respective three rollers 124, the cam hub-rotor couple drops down by resilient force from the respective spring 68,104 to the lower position as shown in FIGS. 2E, 2F. Thus the respective rotor comes close to the contact board 86 and the respective upper contacts 74,112, particularly the raised nubs 74*a*, 112*a*, touch the lower contacts 134 and provide electrical connectivity between the different parts of the contact board 86. The contact springs 82, 116 ensure that an even contact of the nubs 74*a*, 112*a* is made on the board 86. FIGS. 2A, 2B depict an initial stage of movement of the switch assembly 34 and FIGS. 2C, 2D depict an intermediate stage of movement of the switch assembly 34.

Use of the rollers 124 lowers the friction forces, and will increase the lifetime of the MLS 10. Balls or other low frictional bearings or components can substitute for the rollers.

Turning to FIGS. 3A-3E, the locking mechanism that is integrated with the main knob assembly 22 is depicted.

The locking mechanism prevents reaching of certain restricted modes without undertaking the additional step of unlocking the mechanism. To unlock the locking mechanism the operator has to pull back the main knob cover 160 in the direction 228 against the urging of the two coil springs 170. FIGS. 3A, 3B show the cover 160 in its relaxed position by solid lines and its pulled back position by broken lines.

As shown in FIG. 3C, the pin 168 is captured within a restricted zone 231 between adjacent teeth 230, formed as part of the housing 14, where rotary movement of the knob is restrained.

As shown in FIG. 3D once the pin 168 is moved radially outwardly by sliding of the cover 160 as shown dashed in FIG. 3B, the pin 168 is free to be moved, by rotation of the knob, from the position shown as position 168*a* to position 168*b* to position 168*c*, or alternately from position 168*a* to position 168*d* to position 168*e*. The pin 168 passes over the restricted zone 231 between the teeth 230. The main knob can be returned back by rotating the knob, wherein the pin 168 is slipped freely over a slight slope or oblique surface 230a of the teeth 230 of the locking mechanism as it is depicted in FIG. 3E. The pin 168 moves from the illustrated position 168a to position 168b to position 168c.

Figure 4A:
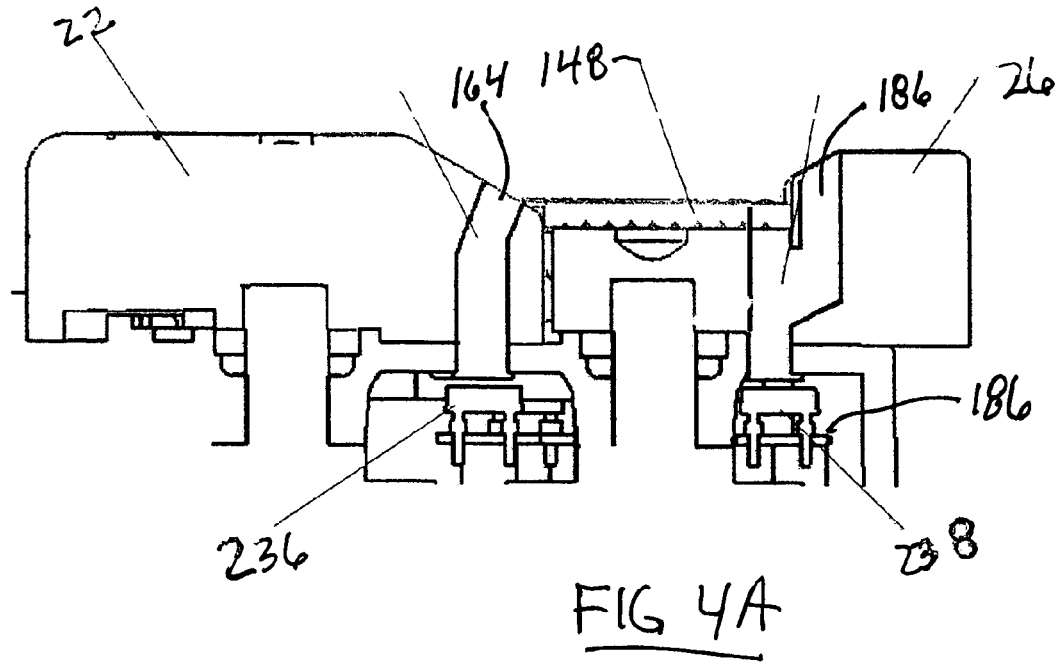
FIGS. 4A is a fragmentary sectional view of the master light switch showing the controls and the mode lens.
Figure 4B:
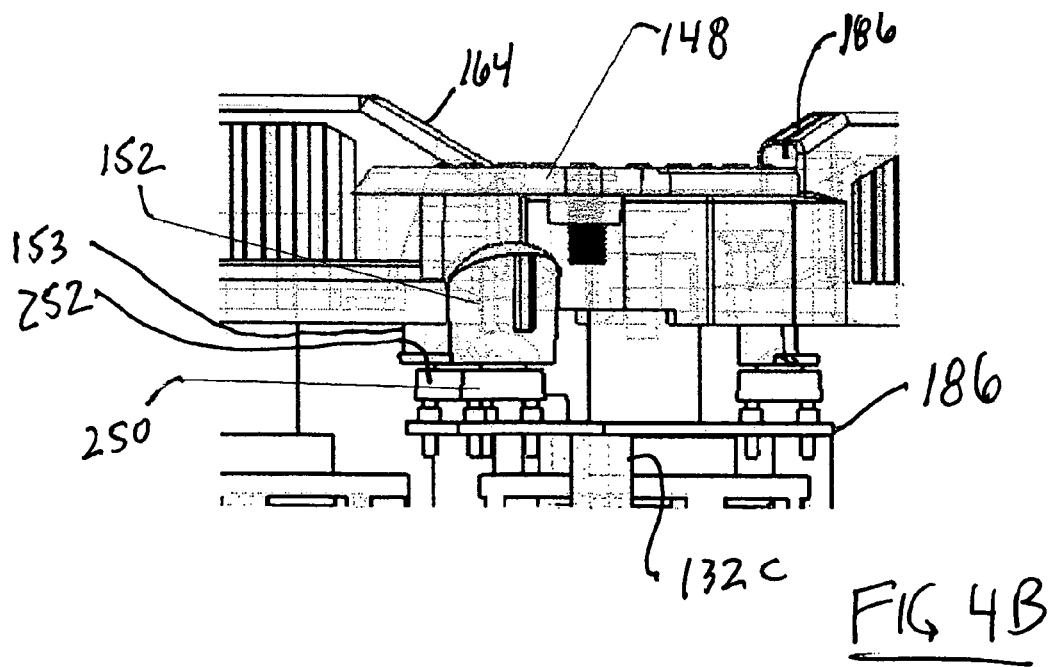
FIGS. 4B is a fragmentary, elevational view of the master light switch showing the controls and the mode lens.

Turning to FIGS. 4A, 4B, illumination of the control panel 148, main knob assembly 22 and auxiliary lever assembly 26 are depicted.

As it is illustrated on FIG. 4A, tips on both main knob assembly 22 and auxiliary lever assembly 26 are illuminated by LED-s 236, 238 through lenses 164, 186, respectively. Lenses 164, 186 are inserted inside of the main knob assembly 22 and auxiliary lever assembly 26.

FIG. 4B shows that the mode lens 148 is illuminated by two LED-s 250, 252 beaming light through the two lenses 152, 153. The LED/lens pair 250/152 is on an opposite side of the switch 10 as the LED/lens pair 252/153, the latter pair shown only partially.

Lenses according to the preferred embodiments of the present invention are advantageously composed of transparent or translucent plastic material.

Turning to FIGS. 5A-5F, examples are illustrated of some varieties of the MLS's Control Panel demonstrating alternate aspects of the invention.

Figure 5A:
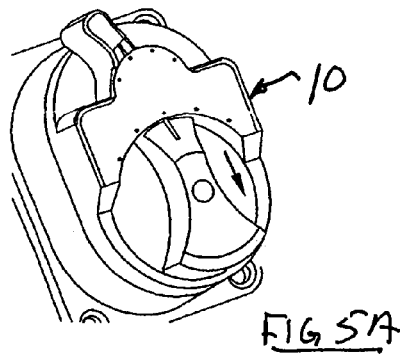
FIGS. 5A-5F are fragmentary, perspective views illustrating some alternate embodiments of the master light switch of the invention.

FIG. 5A depicts the preferred embodiment of the switch 10 herein described.

Figure 5B:
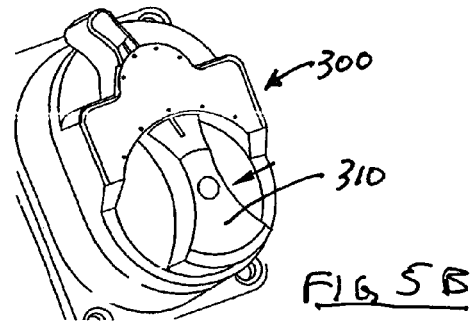

FIG. 5B depicts an alternate embodiment switch 300 that utilizes a push-on main knob 310 to unlock the mechanism.

Figure 5C:
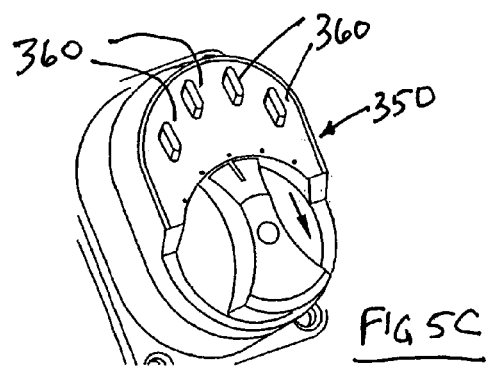

FIG. 5C depicts an alternate embodiment switch 350 that utilizes push auxiliary buttons 360 instead of the auxiliary lever.

Figure 5D:
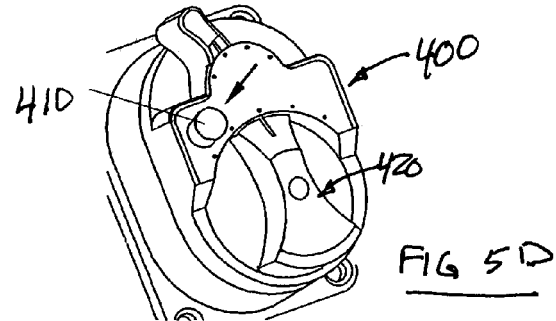

FIG. 5D depicts an alternate embodiment switch 400 that utilizes a separate unlocking push button 410 to unlock the mechanism. The button 410 is located outside of the main knob assembly 420 and it is activated before rotating the main knob assembly 420.

Figure 5E:
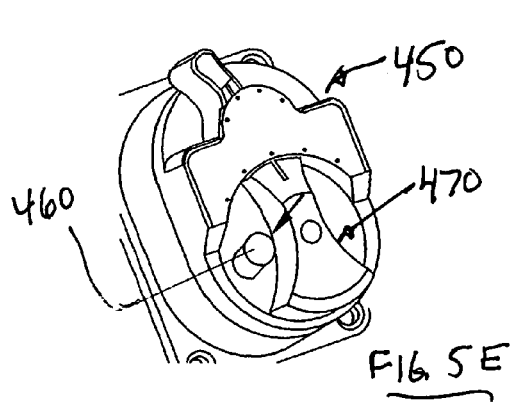

FIG. 5E depicts an alternate embodiment switch 450 that utilizes a separate unlocking push momentary button 460 to unlock the mechanism. The button is located on the main knob assembly 470.

Figure 5F:
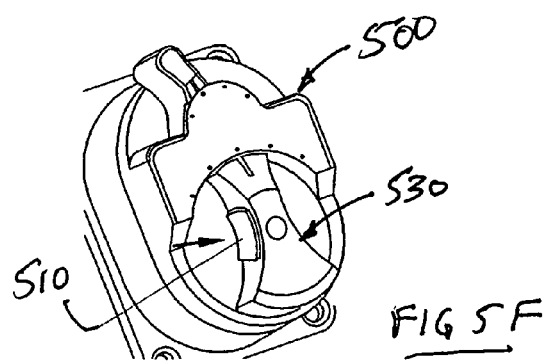

FIG. 5F depicts an alternate embodiment switch 500 that utilizes a separate unlocking push momentary button 510 to unlock the mechanism. The button 510 is located on the side of the main knob assembly 530.

In addition to variations depicted on FIG. 5A-FIG. 5F the shape, size of the knobs, levers and buttons, as well as their locations on the front panel can be different from those shown on FIG. 5A-FIG. 5F to accommodate the MLS design to concrete needs of the production requests, which is in harmony with the present invention.

From the foregoing, it will be observed that numerous variations and modifications may be effected without departing from the spirit and scope of the invention. It is to be understood that no limitation with respect to the specific apparatus illustrated herein is intended or should be inferred.

What is claimed is:

1. A master light switch for a ground vehicle, comprising:
a housing;
an actuator rotatably mounted to said housing;
a switching contact axially movably mounted to said actuator to rotate with said actuator;
a plurality of circuit contacts facing said switching contact wherein different circuit contacts of said plurality of circuit contacts are electrically connectable by said switching contact depending on the rotary position of said actuator;
a spring element urging said switching contact axially towards the circuit contacts to make contact between said switching contact and one or more of said circuit contacts; and
a lift-and-set formation arranged between said housing and said switching contact to axially displace the switching contact from said one or more of said circuit contacts during rotary movement of said actuator and to release said switching contact at a defined rotary position of said actuator to be axially urged by said spring element to axially move to make electrical contact between said switching contact and one or more of said circuit contacts;
said housing comprises a frame and said lift-and-set formation comprises at least one roller rotatably mounted on said frame, and a cam hub mounted with said switching contact to be axially movable therewith and to rotate with said actuator, said cam hub having at least one cam surface engageable with said roller to define an advanced position wherein said switching contact makes contact with one or more of said circuit contacts, and a retracted position wherein said switching contact is displaced from said one or more circuit contacts, as said cam surface passes over said roller, said spring element acting between said housing and said cam hub.

2. The master light switch according to claim 1, wherein said at least one roller comprises a plurality of rollers and said cam hub comprises a plurality of cavities defining a plurality of cam surfaces.

3. The master light switch according to claim 2, comprising a further switching contact, wherein said lift-and-set formation is arranged between said housing and said further switching contact to axially displace said further switching contact from said one or more of said circuit contacts during rotary movement of said actuator and to release said further switching contact at a defined rotary position of said actuator to be axially urged by said spring element to axially move to make electrical contact between said further switching contact and one or more of said circuit contacts, and comprising a rotor mounted to said cam hub, said rotor carrying said switching contact and said further switching contact at rotary offset positions.

4. The master light switch according to claim 3, wherein said switching contact is movably mounted to said rotor in a direction toward and away from said one or more of said circuit contacts, and comprising a further spring element located between said rotor and said switching contact.

5. The master light switch according to claim 1, wherein said actuator comprises a lens therethrough, and comprising a lighting element arranged between said switching contact and said actuator, said lighting element arranged to beam light through said lens to illuminate a portion of said actuator.

6. A master light switch for a ground vehicle, comprising:
a housing;
an actuator rotatably mounted to said housing;
a switching contact axially movably mounted to said actuator to rotate with said actuator;
a plurality of circuit contacts facing said switching contact, wherein different circuit contacts of said plurality of circuit contacts are electrically connectable by said switching contact depending on the rotary position of said actuator; and
a locking mechanism for preventing turning of said actuator unless said locking mechanism is released, said locking mechanism being releasable and said actuator being turnable by one hand of a vehicle driver;

said actuator includes a grippable outer part and a base part, said grippable outer part being mounted for sliding movement on said base part from a first position to a second position, said locking mechanism comprising a locking element mounted to said grippable outer part that engages said housing when said grippable outer part is in said first position to prevent turning of said actuator, said locking element being releasable when said grippable outer part is slid to said second position.

7. The master light switch according to claim 6, wherein said locking element comprises a pin and said housing comprises at least two teeth that releasably capture said pin between said two teeth.

8. The master light switch according to claim 7, wherein at least one of said teeth comprises an oblique surface facing said pin to allow forced rotation of said actuator in a first direction wherein the pin slides along the oblique surface, and wherein at least one of said teeth comprises a perpendicular surface which blocks movement of said pin and does not allow forced rotation of said actuator is a second direction.

9. A master light switch for a ground vehicle, comprising:
a housing;
an actuator rotatably mounted to said housing;
a switching contact axially movably mounted to said actuator to rotate with said actuator;
a plurality of circuit contacts facing said switching contact wherein different circuit contacts of said plurality of circuit contacts are electrically connectable by said switching contact depending on the rotary position of said actuator;
a spring element urging said switching contact axially towards the circuit contacts to make contact between said switching contact and one or more of said circuit contacts; and
a lift-and-set formation arranged between said housing and said switching contact to axially displace the switching contact from said one or more of said circuit contacts during rotary movement of said actuator and to release said switching contact at a defined rotary position of said actuator to be axially urged by said spring element to axially move to make electrical contact between said switching contact and one or more of said circuit contacts;

said spring element is compressed away from one or more of said circuit contacts when said switching contact is displaced from said one or more of said circuit contacts.

10. The master light switch according to claim 9, wherein said housing comprises a frame and said lift-and-set formation comprises at least one roller rotarably mounted on said frame, and a cam hub mounted with said switching contact to be axially movable therewith and to rotate with said actuator, said cam hub having at least one cam surface engageable with said roller to define an advanced position wherein said switching contact makes contact with one or more of said circuit contacts, and a retracted position wherein said switching contact is displaced from said one or more of said circuit contacts, as said cam surface passes over said roller, said spring element acting between said housing and said cam hub.

11. The master light switch according to claim 10, wherein said at least one roller comprises a plurality of rollers and said cam hub comprises a plurality of cavities defining a plurality of cam surfaces.

12. The master light switch according to claim 10, wherein said switching contact is movably mounted to said cam hub in a direction toward and away from one or more of said circuit contacts, and comprising a further spring element located between said cam hub and said switching contact.

13. The master light switch according to claim 9, comprising
a locking mechanism for preventing turning of said actuator unless said locking mechanism is released, said locking mechanism being releasable and said actuator being turnable by one hand of a vehicle driver.

14. The master light switch according to claim 13, wherein said actuator includes a grippable outer part and a base part, said grippable outer part being mounted for sliding movement on said base part from a first position to a second position, said locking mechanism comprising a locking element mounted to said grippable outer part that engages said housing when said grippable outer part is in said first position to prevent turning of said actuator, said locking element being releasable when said grippable outer part is slid to said second position.

* * * * *